United States Patent [19]

Gassaway

[11] Patent Number: 4,893,777
[45] Date of Patent: Jan. 16, 1990

[54] SECURITY MOUNT

[76] Inventor: Mark M. Gassaway, 2201 Stern La., Oxnard, Calif. 93035

[21] Appl. No.: 195,942

[22] Filed: May 19, 1988

Related U.S. Application Data

[62] Division of Ser. No. 947,676, Dec. 30, 1986.

[51] Int. Cl.$^4$ .......................................... F16M 13/00
[52] U.S. Cl. ...................................... 248/551; 70/62; 211/8; 248/223.1; 248/223.2; 248/505; 403/315
[58] Field of Search ............ 248/224.4, 223.1, 223.2, 248/223.3, 551, 552, 553, 505; 70/62, 58; 403/331, 353, 315, 340; 211/8, 9

[56] References Cited

U.S. PATENT DOCUMENTS

| | | | |
|---|---|---|---|
| 993,818 | 5/1911 | Bethea | 248/223.2 X |
| 1,871,972 | 8/1932 | Fenstermaker | 248/243 X |
| 2,326,481 | 8/1943 | Meyer | 248/505 X |
| 2,635,939 | 4/1953 | Obenchain | 248/552 X |
| 3,410,122 | 11/1968 | Moses | 70/58 |
| 3,419,843 | 12/1968 | Hays . | |
| 3,673,828 | 7/1972 | Jones | 70/58 |
| 3,804,357 | 4/1974 | Robinett et al. | 248/553 |
| 3,945,227 | 3/1976 | Reiland | 70/58 |
| 4,022,036 | 5/1977 | Cebuhar | 248/553 X |
| 4,052,867 | 10/1977 | Faunce | 70/58 |
| 4,170,334 | 10/1979 | Villanueva | 248/553 |
| 4,553,414 | 11/1985 | Caputo et al. | 70/58 |
| 4,556,187 | 12/1985 | McLin | 248/552 X |
| 4,585,202 | 4/1986 | Parsekian | 248/553 |
| 4,603,829 | 8/1986 | Koike et al. | 248/553 |
| 4,696,449 | 9/1987 | Woo et al. | 211/8 X |

FOREIGN PATENT DOCUMENTS

| | | | |
|---|---|---|---|
| 509840 | 2/1955 | Canada | 70/58 |
| 801031 | 12/1950 | Fed. Rep. of Germany | 403/408 |

Primary Examiner—Alvin C. Chin-Shue
Assistant Examiner—David L. Talbott
Attorney, Agent, or Firm—Donald D. Mon

[57] ABSTRACT

A two-plate security device. Each plate has a set of similar but opposite directed keyhole slots releasably to be joined by a headed coupler with heads that cannot pass through the neck of the slots, but can pass through a larger opening of the slot. Sliding the plates in-plane relative to one another traps the couplers and holds the plates together. Reversing the movement releases them. The slots are formed in a nonrectangular pattern so as to facilitate correct alignment of the plates when the device is being assembled. Alignment pins and slots are also shown, and also a band to be held by the device to encircle a protected device.

8 Claims, 2 Drawing Sheets

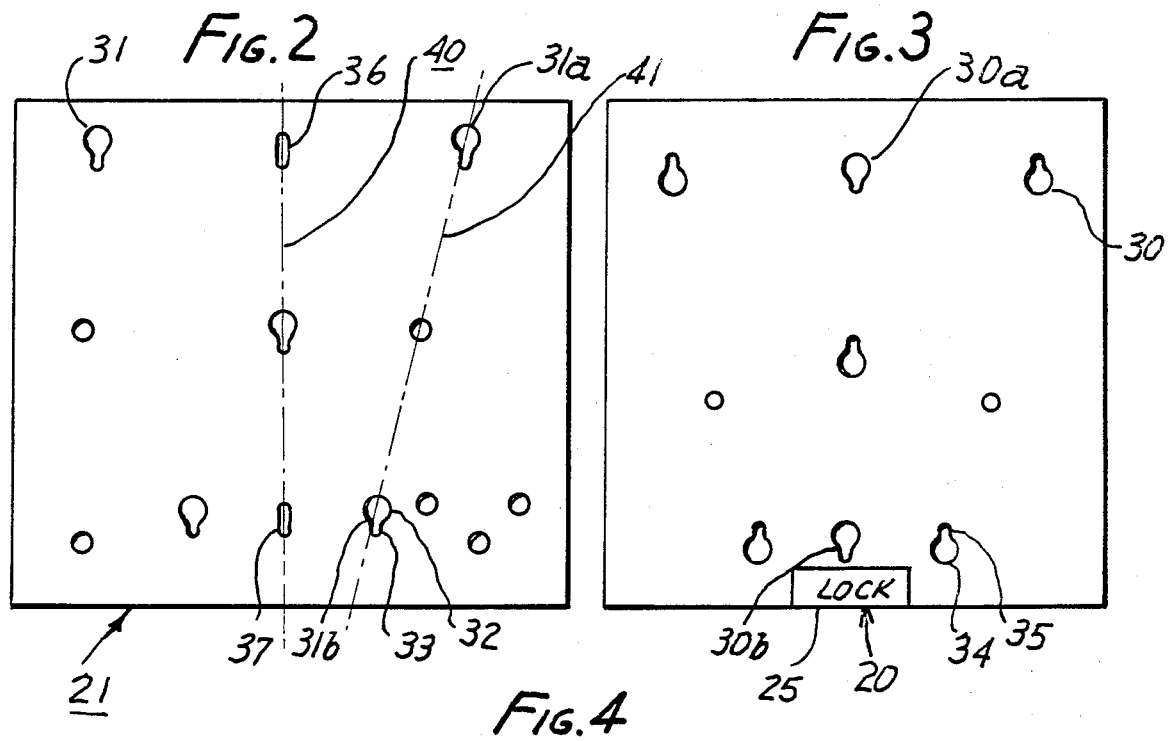
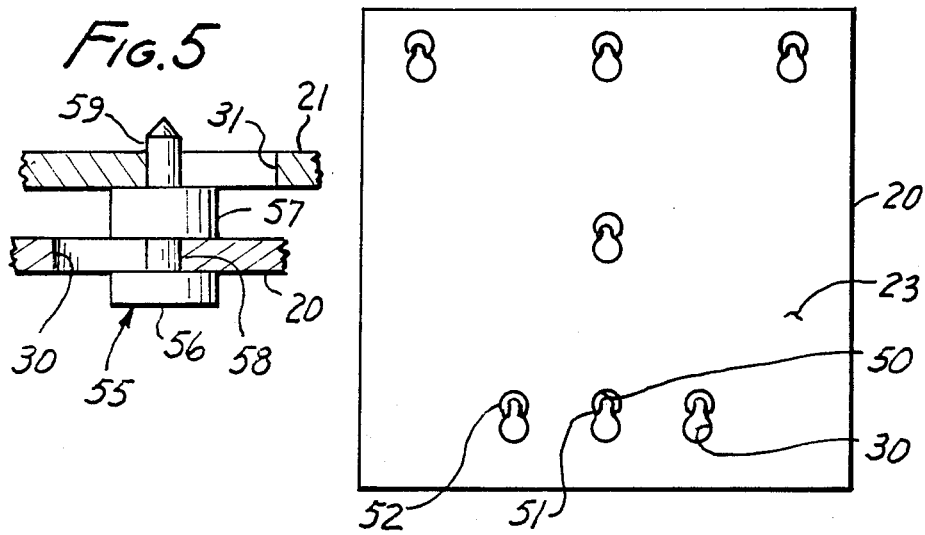
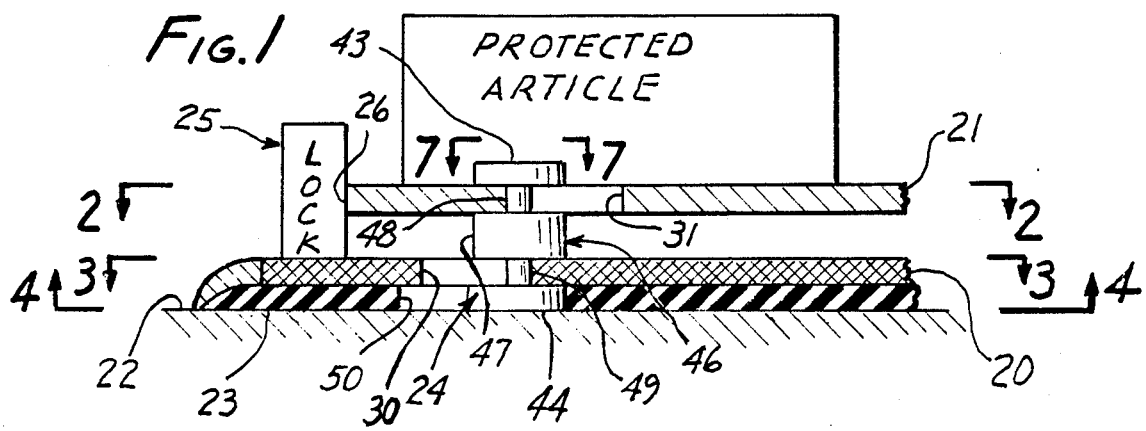

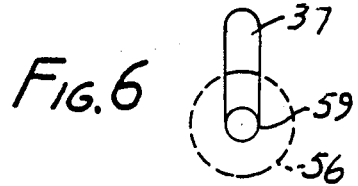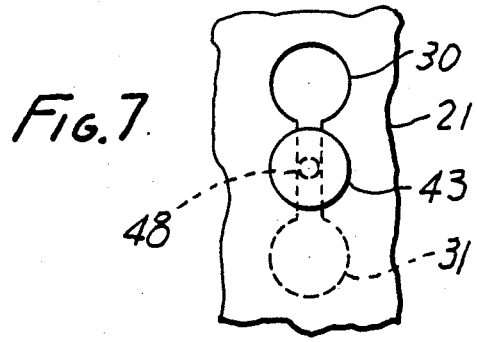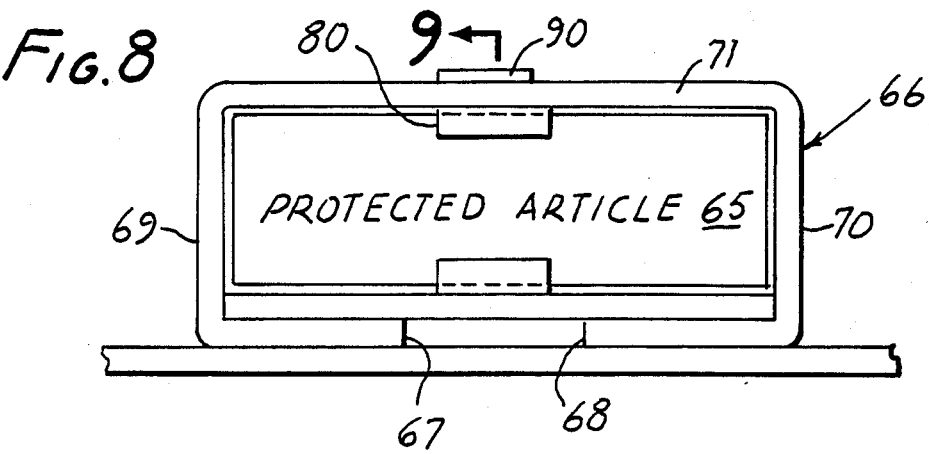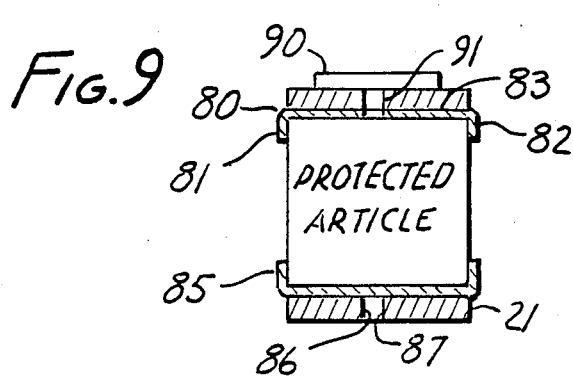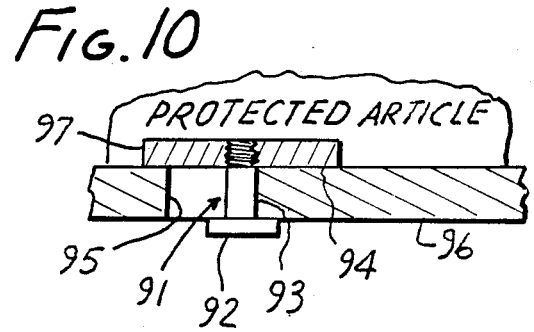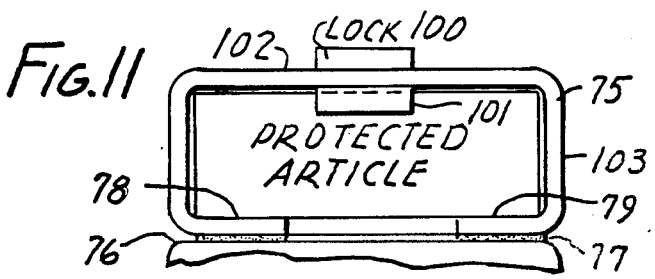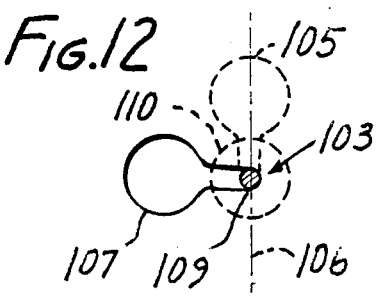

SECURITY MOUNT

CROSS REFERENCE TO OTHER APPLICATION

This is a division of applicant's presently co-pending application Ser. No. 947,676, filed Dec. 30, 1986 entitled SECURITY MOUNTING.

FIELD OF THE INVENTION

This invention relates to means for securing a protected article such as a computer to a supporting surface so as to frustrate its removal.

BACKGROUND OF THE INVENTION

Office equipment has long been an inviting target for thieves. It is generally unitary in construction, compact in design, and except for serial numbers indistinguishable from a multitude of similar articles. As such, if it can be stolen without exposure to risk which too greatly exceeds the anticipated reward, it will be taken. The approach to establishing the risk/reward ratio as perceived by the thief classically relates to the time it takes him to complete the theft and escape without capture, and to the condition of the article after it is stolen.

Generally a theft must be completed within about 5 minutes if the thief is to avoid substantial risk of encounter with the police. Alarmed premises, and even many premises which are not alarmed, will frequently enough have a police response within about 5 minutes and this serves to limit the thief to that length of time. If it were to take more than about five minutes to free the article to be stolen, then generally the article would be safe, or such has been the conventional belief.

Similarly, it has been the accepted concept that the stolen article must not be appreciably damaged. For example, a typewriter with a badly broken frame would not generally be accepted by a fence. Nobody would want it. Therefore, a security means which would require serious damage—perhaps by deformation or fracture—for removal, would be sufficient. Security devices have long been designed with the above criteria in mind. Indeed these criteria remain controlling for many or even most products in many areas, and products designed with them in mind continue to give value and enjoy wide acceptance.

The foregoing assumptions have recently been challenged by some surprisingly aggressive tactics, in which the attacks on the security device are so strong as not only to challenge the properties of the security device itself, but also to inflict damage onto the protected article which previously would have been unacceptable. As a consequence, damage to cases, enclosures, and even to some circuitry, apparently have become tolerable for certain expensive articles, because the remaining undamaged parts of the article will have enough value in themselves to be worth stealing.

Also, some new equipment to be protected has been designed so that partial disassembly is possible even while in a protected configuration. One example is a well known computer whose enclosure is readily replaced by that of a clone. The value resides in the circuit boards within it, and other internal parts, which apparently are marketable in and of themselves. The insides of the computer can be separated from the case by removing a few cap bolts and sliding them out of the case, sometimes past any restraint. It does little good to hold down the outside case if the internal parts can be slid out the rear simply by removing a few nuts or bolts. Hand held battery operated torque tools are a sufficient match for that restraint.

To complicate matters further, many users of equipment are reluctant to mount their equipment permanently, or even semipermanently, to a part of the security device. For example, some users prefer not to adhere their equipment to a security plate by adhesive means, or even by threaded joinders.

It is an object of this invention to provide security means that can frustrate removal even of articles which are not bonded or threadedly joined to the security device, and to do so in such a way as to frustrate or at least greatly to delay removal by means such as disassembly or strong deformation, as might be exerted by a crowbar for example.

In addition to attaining the above objectives, it is an object of this invention to overcome certain troublesome properties of known security devices in which a shear-like movement that involves the entry of heads of a plurality of couplers is facilitated so that they enter respective slots simultaneously or not at all, and can not overtravel. As a consequence, the assembly of the device into its security alignment, and its disassembly from it, are importantly facilitated.

BRIEF DESCRIPTION OF THE INVENTION

Security devices according to this invention derive their function from the trapping of the head of a coupler in a keyhole type slot in a plate. The head of the coupler can pass through an enlarged portion, but not through a narrower neck. When the head is passed through the enlarged portion to the back side of the plate the coupler and/or a plate can be slid in a shear-type movement so that its shank fits in the narrowed neck and the head cannot be pulled free. The other end of the coupler can be similarly headed and engaged to another plate so as to connect the plates together. A protected article can optionally be attached to a second plate, or it can have a coupler directly attached to it and thereby a part of it. Whatever the arrangement, when the device is assembled in its protected configuration, a lock is applied which prevents reverse movement that would release the article.

According to one embodiment of the invention, a plurality of couplers is provided which are intended simultaneously to enter enlarged portions of respective slots. In order to assure simultaneous entry, the slots are offset from each other relative to the direction (axis) of sliding shear-like movement. As a further useful feature, axial slot and pin means is provided which keeps the plates in correct alignment and also prevents the overtravel of one plate relative to the other during disassembly.

As an additional feature of the invention, overhanging flange means can be associated with an overarching band or an underlying base. The band serves to resist upward or sideward removal of the protected article. It may also function as a shelf. A flange retainer may be permanently or removably attached to the band to resist removal in the forward and rearward direction. As preferred features, the band may be retained in place by engagement with couplers or by adhesive bonding to a surface.

The above and other features of this invention will be fully understood from the following detailed description and the accompanying drawings, in which:

BRIEF DESCRIPTION OF THE DRAWINGS

FIG. 1 is a fragmentary vertical cross-section, partly in schematic notation, showing the general arrangement of the invention;

FIGS. 2, 3, and 4 are cross-sections taken at lines 2—2, 3—3, and 4—4, respectively, in FIG. 1;

FIG. 5 is a side view partly in cross-section showing an alignment pin for use in this invention;

FIG. 6 is a fragmentary top view taken at line 6—6 in FIG. 5;

FIG. 7 is a fragmentary top view taken at line 7—7 in FIG. 1;

FIG. 8 is a side elevation showing an other embodiment of the invention;

FIG. 9 is a fragmentary cross-section taken at line 9—9 in FIG. 8;

FIG. 10 is a fragmentary cross-section showing another form of coupler;

FIG. 11 is an end view part in schematic notation, showing yet another feature of the invention; and FIG. 12 shows another slot alignment.

DETAILED DESCRIPTION OF THE INVENTION

FIG. 1 shows the general scheme of coupling a mounting plate 20 and a base plate 21 together so that they will be releasably retained one to the other. The mounting plate is held to a surface 22 such as a desk top by some attachment means. The preferred means is a double faced adhesive mat 23 which adheres both to surface 22 and to the bottom of mounting plate 20. These offer the advantage that the surface need not be penetrated. However, if desired screw or nut-bolt assemblies passed through or threaded into the surface can be used also or instead. Couplers 24 join the plates as will be described below. A releasable lock 25 will be locked to the mounting plate where it will bear against end 26 of the base plate 21 or against the end or edge of the protected article to hold the assembly in its illustrated security condition.

The general scheme of joining the plates together by means of such a coupler is shown in Gassaway patent No. 3,850,392 issued November 26, 1974. Basically it includes the use of keyhole slots 30 in mounting plate 20 (FIG. 3) and keyhole slots 31 in base plate 21 (FIG. 2). FIG. 2 shows base plate 21 with a plurality of slots 31. An exemplary slot 31b is shown as having an enlarged circular portion 32 and a narrow slot portion 33. It will be noted that the narrowed slot portions point downwardly in FIG. 2, all in the same direction.

FIG. 3 shows mounting plate 20 with keyhole slots 30, an exemplary one of which has an enlarged portion 34 and a narrow slot portion 35. It will be observed that the narrowed slot portions in mounting plate 20 point in the opposite direction from those in base plate 21, all in the same direction.

Base plate 21 (FIG. 2) further includes a pair of alignment slots 36, 37 for a purpose yet to be described. It is a feature of this invention that base plate 21 has an axis of shear-like axis 40 of motion. It is along this axis in which it is slid in shear movement relative to mounting plate 20 that results in locking of the device. As a feature, the keyhole slots in the same plate are out of alignment with one another. For example, slots 31a and 31b are offset from axis 40 by different distances so that they fall on an oblique alignment axis 41.

Coupler 24, as best shown in FIG. 1, is a circular structure with a pair of heads 43, 44 spaced from each other by an optional central portion 46. For some installations it is desirable to space the plates 20 and 21 apart from one another, perhaps to receive between them a shelf flange, a grommet, the head of an attachment bolt, or any other collateral article, for example. For such a situation, the central portion includes a spacer 47. In any event it includes aligned shanks 48, 49 whose diameters are such as closely to fit in the narrow slot portions. The diameter of the heads is no larger than the diameter of the enlarged portions of the keyhole slots and is too large to pass through the narrow slot portion.

As can best be seen in FIG. 4, adhesive mat 23 has cutouts 50 at each keyhole slot. They are a generally "figure 8" structure with a narrowed waist 51 and two enlarged portions 52. The heads can be pressed past the narrowed waists so as to tend to be retained at one end or the other unless sufficient force is applied to shove it beyond it.

In FIG. 5 there is shown an alignment pin 55 which has a head 56, an optional spacer 57, and a pair of shanks 58, 59. Shank 59 preferably rises above the surface of the base plate. Pin 55 is fitted into the plates the same as the couplers except that they fit in keyhole slots 30a and 30b in mounting plate 20 in the mounting plate and extend upwardly into the alignment slots 36 and 37. Notice that the narrow portions of Slots 30a and 30b extend oppositely from those of slots 30. (In FIG. 12, the alignment "slots" will merely be round holes). It will be noted that otherwise the length of the alignment slots is substantially equal to the distance the shank must move between its centered position in the enlarged portion and its end position in the narrowed portion plus one diameter of the shank. FIG. 6 schematically shows the fit of the shank 58 in one of the alignment slots.

FIG. 7 is a schematic overlay of the mounting plate, base plate and coupler in the security condition. It shows that slot 31 of base plate 21 has been moved relative to the slot 30 of mounting plate 20 so as to trap the shank 48 of a coupler between the ends of the respective narrowed portion. Overhanging heads 43, 44 are shown which under these circumstances will prevent separation of the two plates.

FIG. 8 shows a technique which can be utilized conveniently in combination with what is been previously disclosed to prevent a protected article 65 from being removed, even though it may not be fixedly attached to a base plate. The term "base plate" has been used herein to define a plate which is attached to the base of an article to be protected. It is customary to mount the article to such a plate by means of an adhesive pad or perhaps by threaded joinder as preferred, this detail being of no importance to the invention. However, with the construction shown in FIG. 8 it becomes possible to allow the protected article to be held in the device without anchoring the article itself to the base plate. For this purpose, and even if it is attached to the base plate, a band 66 having a pair of inwardly directed flanges 67, 68, two side walls 69, 70 and a top 71 is applied by any suitable means to the base. A known and useful example is to provide an opening (not shown) in flanges 67 and 68 which can neatly fit over spacers 47 of respective couplings before the base plate is installed so that the flange cannot be pulled out. This is one reason to provide spacer 47. This will provide a reliable and substantial retention means for the band which thereby will prevent the band from being removed. Accordingly, it will trap a protected article 65 from being lifted off or moved from side to side when the device is in its secured condition.

Alternatively, as shown in FIG. 13, a band 75 may be provided with adhesive means 76, 77 for each of its flanges 78, 79. These flanges may be applied either directly to a mounting plate, or to the top of another band, or even to a surface such as a desk or table top.

Reverting to the embodiment of FIGS. 8 and 9 it will be seen that a retainer 80 is provided having a pair of flanges 81, 82 with a bight 83 interconnecting them. There may be an upper retainer 80, or a lower retainer 85, or both. The lower retainer may conveniently be provided with a depending stud 86 fitted into a hole 87 in the base plate which will retain it against pull out, or the stud may be replaced by a threaded fastener threaded into the base plate. The upper retainer 80 may be held to the top 71 by means of a releasable lock 90. The lock will have a shank 91 which can be threaded into the bight 83 to form a means for releasing the upper retainer if desired. The lock prevents unthreading unless released. It will now be seen that the retainers will not only prevent the protected article from being slid out the ends to the right or to the left in FIG. 9, but also can be provided with flanges of sufficient overhang that the internal workings of the protected article cannot be removed independently of its case, nor can its case be removed past them.

FIG. 10 illustrates another means for holding a protected article 90 without requiring the use of a base plate. In this situation, a coupler 91 is provided with a head 92 and a shank 93 as in the embodiment of FIG. 1 but the shank is threaded into a larger head 94 which may conveniently be made of an elastomer of significantly larger lateral dimensions. These dimensions are such that it will overhang any slot 95 in a respective mounting plate 96. The head 94 may either be bonded directly to the protected article or if the protected article is itself sufficiently restrained, may be fitted into a receptacle 97 in its bottom.

FIG. 11 shows that a lock 100 may be utilized to releasably to hold a retainer 101 identical with retainer 80 to the top of top 102 of a band 103, or to some other surface.

FIG. 12 illustrates an alternative relationship between slots. In this arrangement, slot 105 on a upper base plate is related to an axis of motion 106, while a second slot 107 in the base plate is at right angles thereto. For this arrangement, before the plates are brought together a coupler 108 is moved to the position indicated by its shank 109, at which time it will be in alignment with the respective slot 105. Then the slot 105 moves with its plate to form the locking engagement shown in FIG. 12, heads 110 overhanging the plates. This indicates that parallelism of the narrow portions is not a limitation on this invention. Also, because the narrow portions are not aligned, instead of providing slots for the alignment pins in the base plate as in FIG. 2, only a hole will be formed therein because the risk of overtravel on disassembly does not exist. These pins are therefore used in FIG. 12 only for alignment purposes.

The constructions described above have considerable advantages in comparison with known devices. For example, in know devices the axes 40 and 41 are parallel. A problem with this arrangement is that it is possible for one of the couplers to engage before the remaining ones do should one plate be canted relative to the other. It then becomes a very difficult task for the user (who often is working blind), to arrange to separate the plates and start again. By providing the axes 40 and 41 at an angle relative to one another, experience has shown that no coupling will engage before all the other couplings also engage. In order to assist this objective, the alignment slots are provided which engage in the alignment pins. This is the reason why the alignment pins extend somewhat higher than would ordinarily be required. Then the two plates are held in alignment with one another and the couplings will not engage except in synchronism. This has proved to be a substantial advantage in the application of this device both in installing it and in separating it.

Also as to the installation and separation of the device, it will be noted that the sum of the lengths of the narrow portions in the two plates is greater than the amount of motion which necessarily must occur. This sometimes results in a situation in which the coupler has been moved to an arbitrary position relative to the other couplers during disassembly. Then one plate hangs up on the other in a position unknown to the user. By providing the alignments slots with a specific length which restricts the relative movement of the plates to that required for locking and unlocking, overtravel of the couplers is prevented, and the couplers are restrained within a range such that the plates will not hang up relative to one another.

The means shown in FIG. 8 to restrain a band, while known, provide a significant advantage in the retention of the article against removal from end to end, especially if the user objects to directly attaching the protected article to the base plate. It also offers an additional security provision in the event that the user does employ means for holding the protected article to the base plate. The upper retainer can readily be released by releasing the upper lock. The lower retainer will be released along with the band itself, being held in place basically by the interference between the band and its own flanges. Other means such as the stud shown may be provided instead for this retention.

This device thereby provided improved means for facilitating the assembly and disassembly of the device, improved means to prevent the removal of a protected article which may or may not be secured directly to a base plate, and to other arrangements of the keyslots which also advantageously restrain the article against movement relative to one another.

The lock means as provided are attached to the mounting plate and serve as an abutment to prevent the backing off of certain parts such as the article itself or the base plate which would permit removal. Typically these are screw threaded locked screws threaded into a mounting block and into a mounting plate. This type of locking device is well known in the art. In addition, the lock block, instead of bearing directly against one of the plates, may bear against a protected article or against the flanged retainer as may be preferred.

This invention thereby provides an improved security device for overcoming the more aggressive tactics of thieves, more strongly encloses the protected article, and provides other means for facilitating the assembly and disassembly of the device.

This invention is not to be limited by the embodiments shown in the drawings and described in the description, which are given by way of example and not of limitation, but only in accordance with the scope of the appended claims.

I claim:

1. A security device comprising:

a mounting plate adapted to be attached to a surface, said plate having an axis of relative motion, said plate having a plurality of keyhole slots therethrough, each said slot having an enlarged portion and a narrowed neck portion, said neck portions extending parallel to said axis, and a plurality of said slots being disposed at a different location along said axis, at different lateral distances therefrom;

a coupler respective to each of said last-mentioned slots mounted to structure in a like relationship, each coupler having a shank and a head, the head being proportioned to pass through the enlarged portion but not through the neck portion, the shanks being proportioned to enter the neck portions, the length of the shanks being sufficient to enable the heads to pass through the mounting plate; and releasable lock means to hold the device in a security condition;

said security device including a base plate adapted to lay parallel to said mounting plate, said base plate being adapted to receive an article to be protected and in which said base plate is provided with a plurality of similarly situated and shaped, but oppositely directed keyhole slots, and said couplers including a second such head spaced from said first head to be passed through the respective enlarged portion, the shank being proportioned to fit in both neck portions;

said mounting plate includes a plurality of alignment keyhole slots aligned along said axis, with neck portions oppositely directed from the other keyhole slots in said mounting plates; in which an alignment slot is formed in said base plate respective to each alignment keyhole slot, extending axially; and in which an alignment pin comprises a shank, a head to engage in the alignment keyhole slots in said mounting plate, and a pin adapted to fit and slide in said alignment slots, said slots being disposed and arranged as to limit axial movement of the base plate in an unlocking direction.

2. A security device according to claim 1 in which a spacer segment is incorporated in said shank to space said plates apart.

3. A security device according to claim 1 in which said keyhole slots are oppositely directed in the sense of being normal to one another.

4. A security device according to claim 1 in which said alignment slots are round holes.

5. A security device according to claim 1 in which a band includes a pair of flanges adapted to be trapped between said plates, a pair of sides and a top, whereby to trap an article to be protected.

6. A security device according to claim 5 in which retainer means having a pair of overhanging flanges is releasably attached to said top further to retain said article.

7. A security device according to claim 6 in which releasable lock means attaches said retainer to said top.

8. A security device according to claim 5 in which retainer means having a pair of overhanging flanges is attached to said band flanges so as to underlay the protected article.

* * * * *